United States Patent Office 3,657,265
Patented Apr. 18, 1972

3,657,265
PROCESS FOR PREPARING BENZOXAZOLONES FROM AROMATIC NITRO COMPOUNDS
Ehrenfried H. Kober, Hamden, and Philip D. Hammond, North Haven, Conn., assignors to Olin Corporation
No Drawing. Filed June 21, 1968, Ser. No. 738,791
Int. Cl. C07d 85/48
U.S. Cl. 260—307 C                                14 Claims

ABSTRACT OF THE DISCLOSURE

The process for preparing benzoxazolones by reacting an aromatic nitro compound, in which at least one of the two ortho positions is unsubstituted, with carbon monoxide and carbon dioxide in the presence of a catalyst and recovering the benzoxazolones produced thereby.

The catalyst may be a mixture of a halide or an oxide of palladium or rhodium with an oxide of an element selected from the group consisting of vanadium, molybdenum, tungsten, niobium, chromium and tantalum.

---

This invention relates to a process for preparing benzoxazolones from aromatic nitro compounds.

2-benzoxazolone, having the structural Formula I, which is tautomeric with 2-hydroxy benzoxazole of structural Formula II, has been prepared in a variety of ways from ortho-aminophenol and phosgene, chloroform or chloroformic ester, and also by heating with urea. Other previously known techniques for preparing benzoxazolones have been even more expensive and complicated.

(I)

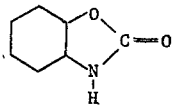

(II)

and

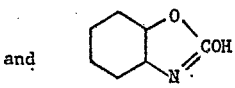

Virtanen and Hietala in Acta Chem. Scand. vol. 2, page 1543 (1955) disclose the acid treatment of crushed rye seedlings to isolate 2-benzoxazolone. The compound was found to have antimicrobial activity. In addition, benzoxazolones may be reacted with a phosphorus halide such as phosphorus pentachloride to form 2-chloro-benzoxazoles of the type described and claimed in U.S. Pat. No. 3,284,294, issued Nov. 8, 1966, to Sasse et al. These chloro-benzoxazoles are useful for combating nematodes and soil fungi.

It is a primary object of this invention to provide an improved process for preparing benzoxazolones.

It is a further object of this invention to provide a process for preparing benzoxazolones from aromatic nitro compounds.

These and other objects of the invention will be apparent from the following detailed description.

It has now been discovered that the foregoing objects are accomplished when an aromatic nitro compound, in which at least one of the two ortho positions is unsubstituted, is reacted with carbon monoxide and carbon dioxide in the presence of a catalyst, and the resulting benzoxazolone is recovered from the reaction mixture.

More in detail, any aromatic nitro compound having at least one of the two ortho positions unsubstituted may be employed as a reactant. The term "aromatic nitro compound," as used throughout the description and claims, is intended to include unsubstituted as well as substituted aromatic nitro compounds, with the provision that at least one of the two-ortho positions is unsubstituted. Typical examples of suitable aromatic nitro compounds which can be reacted to form benzoxazolones include the following:

(1) nitrobenzene
(2) o-, m- or p-nitrotoluenes
(3) o-, m- or p-monochloronitrobenzenes
(4) o-, m- or p-monofluoronitrobenzenes
(5) o-, m- or p-monobromonitrobenzenes
(6) 3- or 4-nitro-o-xylenes
(7) 4-, 5- or 6-nitro-m-xylenes
(8) 2-nitro-p-xylenes
(9) 3- or 4-nitro-o-dichlorobenzenes
(10) 4-, 5- or 6-nitro-m-dichlorobenzenes
(11) 2-nitro-p-dichlorobenzenes
(12) 3- or 4-nitro-o-dibromobenzenes
(13) 4- or 5-nitro-1,2,3-trichlorobenzenes
(14) 5- or 6-nitro-1,2,4-trichlorobenzenes
(15) o-, m- or p-nitro biphenyls
(16) 1- or 2-nitro naphthalenes
(17) bis(o-, m- or p-nitro diphenyl)ethers
(18) bis(o-, m- or p-nitro phenyl)methanes
(19) bis(o-, m- or p-nitro phenyl)ethanes
(20) bis(o-, m- or p-nitro phenyl)dialkylethers.

All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato and the like and employed as reactants in the novel process of this invention, provided that at least one of the two positions ortho to one of the nitro groups is unsubstituted.

In addition, isomers and mixtures of the aforesaid aromatic nitro compounds and substituted aromatic nitro compounds may also be employed, as well as homologues and other related compounds. Generally, the aromatic nitro compounds and substituted aromatic nitro compounds contain between about 6 and about 14 carbon atoms.

Catalysts which may be utilized in the novel technique of this invention include elements and compounds of elements found in Groups Ib, IIb, IIIa, IIIb, IVa, IVb, Va, VIa, VIb, VIIa, VIII and the Lanthanide series of the Periodic Table shown on page 122 of Inorganic Chemistry, by Moeller, John Wiley and Sons, Inc., 1952. It was found that certain metals and compounds of these metals have a much greater catalytic effect than others, when compared on an equal weight basis. Those metals, in elemental or compound form, which are preferred because they show the greatest catalytic effect are as follows:

(1) Palladium           (10) Platinum
(2) Rhodium             (11) Cobalt
(3) Vanadium            (12) Nickel
(4) Molybdenum          (13) Germanium
(5) Ruthenium           (14) Tin
(6) Tungsten            (15) Osmium
(7) Tantalum            (16) Copper
(8) Chromium            (17) Silver
(9) Niobium Other metals which may also be employed as a catalyst, either elemental or a compound form, but which are less effective than those listed above are as follows:

(1) Aluminum
(2) Scandium
(3) Manganese
(4) Iron
(5) Zinc
(6) Gallium
(7) Yttrium
(8) Zirconium
(9) Masurium
(10) Lutecium
(11) Cadmium
(12) Indium
(13) Lanthanum
(14) Hafnium
(15) Silicon
(16) Rhenium
(17) Iridium
(18) Titanium
(19) Gold
(20) Mercury
(21) Thallium
(22) Lead
(23) Cerium
(24) Praseodymium
(25) Neodymium
(26) Illinium
(27) Samarium
(28) Europium
(29) Gadolinium
(30) Terbium
(31) Dysprosium
(32) Holmium
(33) Erbium
(34) Thulium
(35) Ytterbium Compounds of the above elements which can be utilized in accordance with the process of this invention include oxides, sulfates, nitrates, halides, carbonates, sulfites, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, pallidium dichloride, palladium difluoride and palladium diiodide; rhodium halides such as rhodium tribromide, rhodium trichloride, rhodium trifluoride, and rhodium triiodide; palladium oxides such as palladium suboxide ($Pd_2O$), palladium monoxide ($PdO$), and palladium dioxide ($PdO_3$); rhodium oxides such as rhodium monoxide ($RhO$), rhodium sesquioxide ($Rh_2O_3$), and rhodium dioxide ($RrO_2$); chromic oxide ($Cr_2O_3$), chromium dioxide ($CrO_2$) and chromous oxide ($CrO$); molybdenum sesquioxide ($Mo_2O_3$), molybdenum dioxide ($MoO_2$), and molybdenum trioxide ($MoO_3$); ruthenium trichloride ($RuCl_3$), ruthenium pentafluoride ($RuF_5$), ruthenium hydroxide [$Ru(OH)_2$], ruthenium dioxide ($RuO_2$), and ruthenium tetraoxide ($RuO_4$); niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$), and vanadium pentoxide ($V_2O_5$), mixtures thereof, and the like.

In addition, carbonyls of certain elements such as nickel, cobalt, iron, rhodium, molybdenuum, chromium, tungsten, and ruthenium, and carbonyl chlorides of certain elements such as palladium, rhodium, ruthenium and any of the aforesaid elements capable of forming carbonyls can be used as the catalyst. Mixtures of two or more of these carbonyl compounds may be employed as the catalyst system.

Furthermore, the aforesaid catalyst compositions may be used as a mixture or complex with heteroaromatic compounds. Heteroaromatic compounds containing only nitrogen and carbon in the ring are preferably used, but one which contains only carbon and sulfur or only carbon and oxygen, or carbon and two or more elements selected from the group consisting of nitrogen, sulfur, and oxygen may also be employed. Typical heteroaromatic compounds include pyridine, pyridine-1-oxide, 2-chloropyridine, isoquinoline, quinoline, 1-methyl imidazole, 4,6 - dimethyl pyridine, thiophene, dibenzofuran, 2,5-diphenyloxazole, 2-mercaptobenzothiazole, thionaphthene, etc.

Although all of the aforesaid catalysts have some effect upon increasing the yield of benzoxazolones, and may be used individually or admixed with one or more of the other catalysts. Some of the catalysts are significantly more effective than others. Included in these more effective catalyst systems are those comprised of a mixture of at least one compound selected from the group consisting of palladium halides, rhodium halides, palladium oxides, and rhodium oxides with an oxide or an element selected from the group consisting of vanadium, molybdenum, tungsten, niobium, chromium and tantalum, with or without other catalysts, and especially the following:

(1) Palladium dichloride and vanadium pentoxide
(2) Palladium dichloride and molybdenum dioxide
(3) Rhodium trichloride and vanadium pentoxide
(4) Rhodium trichloride and molybdenum dioxide
(5) Palladium dichloride, rhodium trichloride and vanadium pentoxide
(6) Rhodium trichloride, platinum tetrachloride and vanadium pentoxide
(7) Palladium dichloride, molybdenum dioxide and cupric bromide
(8) Palladium dichloride, rhodium trichloride, vanadium pentoxide and cupric bromide When one of the above-mentioned preferred catalyst systems is employed, the weight ratio of palladium or rhodium compound to oxide of the Group Vb or VIb metals in the catalyst system is generally in the range between about 0.001:1 and about 25:1, and preferably in the range between about 0.05:1 and about 10:1, but greater or lesser proportions may be employed if desired. When other catalytic additives such as cupric bromide, platinum tetrachloride, heteroaromatic compounds and the like the like are employed as part of the catalyst system, the weight ratio of the catalytic additive to the oxide of the Group Vb or VIb metals is also within the above-mentioned catalyst ratio ranges.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, Fuller's earth, and analogous materials are useful as carriers for this purpose.

If desired, the components of the catalyst system may be activated by suspending the catalysts in a suitable liquid which is capable of dissolving the aromatic nitro compound subsequently added, and then admixing carbon monoxide with the resulting suspension at an elevated temperature and elevated pressure. A suitable activation technique is described in U.S. Pat. No. 3,523,964, issued Aug. 11, 1970, by Kober, Schnabel and Hammond.

Without any intention of being limited by theory, it is believed that a nitrene intermediate is formed by the abstraction of the two oxygen atoms from the nitro group by means of carbon monoxide in the presence of a catalyst, followed by the addition of carbon dioxide to the nitrene intermediate in the presence of a catalyst, as illustrated by the following equations:

(III) 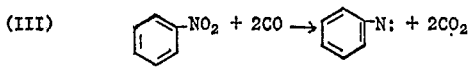

(IV) 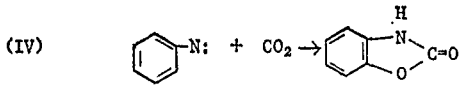

Thus it appears that the reaction requires an oxygen abstractor, such as carbon monoxide, to form the nitrene intermediate in the first step, and that the formation of benzoxazolone in the second step requires carbon dioxide.

In a preferred embodiment of the invention, the aromatic nitro compound and catalyst, are placed in a suitable pressure vessel, such as an autoclave which is equipped with a gas sparger for feeding gas into the bottom thereof. The pressure vessel is also preferably provided with agitation means as well as cooling and heating means. After the slurry of catalyst and aromatic nitro compound is placed into the pressure vessel, it is sealed, and a mixture of carbon dioxide and carbon monoxide are pumped into the pressure vessel through the gas sparger until the desired pressure is obtained under the temperature conditions employed. The ratio of carbon dioxide to carbon monoxide in the initial charge may be varied over a wide range, but is generally in the range between about 100:1 and about 0.05:1 and preferably between about 25:1 and about 0.1:1.

After the desired temperature and pressure conditions are obtained, carbon monoxide, either alone or admixed with carbon dioxide, is fed continuously through the sparger into the suspension of catalyst and aromatic nitro compound during the entire reaction period while maintaining the pressure at the desired level. The ratio of carbon dioxide to carbon monoxide in the gas stream fed through the sparger during the reaction is generally in the same range as that described above for the gas phase used to attain the initial pressure.

In another embodiment, the initial gas charged to the reactor is solely carbon dioxide, and the gas stream fed to the pressure vessel during the reaction period is solely carbon monoxide, or a mixture of carbon monoxide and carbon dioxide, in the ratio range described above.

The order of mixing the reactants is not critical and may be varied within the limitations of the equipment employed. In one embodiment, the aromatic nitro compound, catalyst system, and, if desired, solvent, is charged to a suitable pressure vessel such as an autoclave which was previously purged with nitrogen, and which is preferably provided with agitation means such as a stirrer or an external rocking mechanism. The intial pressure can be attained by feeding carbon dioxide, or a mixture of carbon dioxide and carbon monoxide, as described above, into the autoclave. The initial operating pressure is in the range between about 30 and about 10,000 p.s.i.g., and preferably between about 100 and about 8000 p.s.i.g., but greater or lesser pressures may be employed if desired.

Generally the quantity of carbon monoxide and carbon dioxide in the free space of the reactor is maintained at a level sufficient to maintain the desired pressure as well as provide reactants for the process, as the reaction progresses. If desired, additional carbon monoxide and carbon dioxide can be fed to the reactor either intermittently or continuously as the reaction progresses to maintain the pressure within the above range. The total amount of carbon monoxide added during the reaction is generally between about 3 and about 50, and preferably between about 8 and about 15 moles of carbon monoxide per nitro group in the aromatic nitro compound. The proportion of carbon dioxide may be within the same range or substantially less than the carbon monoxide. Greater or lesser amounts of either gas may be employed if desired. The highest carbon monoxide and carbon dioxide requirements are generally utilized in a process in which the gases are added continuously, but suitable recycle of the gas streams greatly reduces the overall consumption of carbon monoxide and carbon dioxide.

The proportion of catalyst system is generally equivalent to between about 0.1 and about 100 percent, and preferably between about 1 and about 60 percent by weight of the aromatic nitro compound. However, greater or lesser proportions may be employed if desired.

The reaction between carbon monoxide, carbon dioxide and aromatic nitro compound may be effected in the absence of a solvent, but improved overall yields of the benzoxazolones can be obtained when a solvent which is chemically inert to the components of the reaction system is employed. Suitable solvents include aliphatic, cycloaliphatic, aromatic solvents such as n-heptane, cyclohexane, benzene, toluene, and xylene, and halogenated aliphatic and aromatic hydrocarbons such as dichloromethane, dichloroethane, tetrachloroethane, monochloronapthalene, monochlorobenzene, trichloroethylene, and perchloroethylene, as well as sulfur dioxide, mixtures thereof and the like.

The proportion of solvent is not critical and any proportion may be employed which will not require excessively large equipment to contain. Generally the weight percent of aromatic nitro compound in the solvent is in the range between about 5.0 and about 75 percent, but greater or lesser proportions may be employed if desired.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, on the catalyst and on the amount of catalyst being charged, as well as the type of equipment being employed. Usually between one-half and and 20 hours are required to obtain the desired degree of reaction in a batch operation, but shorter or longer reaction times may be employed. In a continuous process, the reaction time may be much lower, i.e., substantially instantaneous and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the benzoxazolones from the reaction product. However, other suitable separation techniques such as extraction, sublimation, etc., may be employed to separate the benzoxazolone from the unreacted aromatic nitro compound and any by-products that may be formed.

Benzoxazolones produced in accordance with the technique of this invention are suitable for use as antimicrobial agents and as intermediates in the preparation of chlorobenzoxazoles, which are useful for combating nematodes and soil fungi.

The activity of many of the aforesaid catalysts can be improved by pretreatment with certain acid halides. This pretreatment technique appears to be especially effective with alloys such as "Hastelloy B" and "Hastelloy C" which are trademarks of Haynes Stellite Co. for certain nickel alloys. The average composition of "Hastelloy B" is 64 percent nickel. 28 percent molybdenum, 5 percent iron, 1 percent silicon, 1 percent chromium, 1 percent manganese, and that of "Hastelloy C" is 56 percent nickel, 15.5 percent chromium, 16 percent molybdenum, 6 percent iron, 4 percent tungsten, 1 percent cobalt, 0.5 percent silicon, 0.5 percent manganese, 0.5 percent vanadium and traces of carbon, phosphorus and sulfur.

Acid halides useful for this purpose are selected from the group consisting of acid halides of carbon, acid halides of sulfur, acid halides of phosphorus, acid halides of vanadium and organic acid halides (RCO Hal) and organic sulfonyl halides ($RSO_2$ Hal) where R is selected from the group consisting of an aromatic, aliphatic, and mixed aromatic-aliphatic moiety, and Hal is a halogen selected from the group consisting of chlorine, fluorine, bromine and mixtures thereof. Typical examples of suitable acid halides include phosgene, thionyl chloride, thionyl bromide, thionyl fluoride, sulfonyl chloride, phosphorus oxychloride, phosphorus oxyfluoride, vanadyl monobromide (VOBr), vanadyl dibromide ($VOBr_2$), vanadyl tribromide ($VOBr_3$), vanadyl chloride [$(VO)_2Cl$], vanadyl dichloride ($VOCl_2$), and vanadyl trichloride ($VOCl_3$). Suitable organic acid chlorides include benzoyl chloride, acetyl chloride, propionyl chloride. Other suitable compounds include the carbonic acid chlorides and sulfonic acid chlorides described in Canadian Pat. No. 692,093, issued Aug. 4, 1964, to Ehrenfried H. Kober et al.

The proportion of acid halide is generally equivalent to between about 0.005 and about 0.1 and preferably between about 0.006 and about 0.09 mole of acid halide per mole of nitro groups in the organic nitro compound.

Activation of the catalyst is effected by admixing the solid catayst in finely divided form with the acid halide, preferably in the presence of an inert solvent such as benzene or other aromatic hydrocarbons, a halogenated aromatic hydrocarbon, or a halogenated aliphatic hydrocarbon, such as one of the fluorinated hydrocarbons sold under the trademark "Freon." The proportion of solvent may range between about 1 and about 500 percent by weight of the acid halide, but greater proportions may be employed if desired. After the catalyst has been reacted with the acid halide for between about 0.1 and about 48 hours and preferably between about 0.5 and between about 4 hours, the catalyst is decanted, filtered, or otherwise separated by other suitable solid-liquid separation techniques. The treated catalyst is then added directly to the reactor or may be washed with suitable solvent to remove unreacted acid halide prior to adding to the reactor.

The following examples are presented to describe the invention more fully without an intention of being limited thereby. All parts and percentages are by weight unless otherwise specified.

EXAMPLE 1

A 300 milliliter stainless steel autoclave, provided with a mechanically driven agitator, an internal cooling coil, an external heating mantle, and ag as sparger for feeding carbon monoxide into the bottom of the autoclave, was charged with 120 grams of nitrobenzene, 1.2 grams of palladium dichloride, and 7.2 grams of vanadium pentoxide. The autoclave was then flushed three times with carbon monoxide and pressurized to 510 p.s.i.g. with a mixture of gas consisting of 485 p.s.i.g. of carbon dioxide and 25 p.s.i.g. of carbon monoxide, which corresponds to a carbon dioxide to carbon monoxide ratio of about 95:5. The agitator was started and the autoclave was heated to about 140° C. When the temperature inside the autoclave had reached 114° C., feeding of carbon monoxide through the sparger was started at a rate of 250 milliliter per minute (measured at atmospheric pressure) and carbon monoxide and carbon dioxide were withdrawn from the autoclave at the same rate, while maintaining the pressure in the autoclave at about 560 p.s.i.g. The ratio of carbon dioxide to carbon monoxide in the off-gas was determined by vapor phase chromatography.

After about 5 hours the ratio of carbon dioxide to carbon monoxide had been reduced from the ratio of 95:5 originally charged to 32.9:67.1. The autoclave was then cooled to room temperature. The liquid reaction mixture was withdrawn and analyzed by vapor phase chromatography. The analysis revealed that the liquid reaction product consisted of 89.7 percent nitrobenzene, 5.5 percent phenylisocyanate, 2.5 percent benzoxazolone and 0.4 percent aniline. Thus, the conversion of nitrobenzene was 10.3 percent and the corrected yield of benzoxazolone was 24.3 percent.

For purposes of comparison, Example 1 was repeated, except that the autoclave was pressurized initially with 500 p.s.i.g. of carbon monoxide only. Agitation and feeding of carbon monoxide at a rate of 500 milliliters per minute (measured at atmospheric pressure) was started at room temperature and maintained throughout the experiment. After feeding carbon monoxide at above rate for 3.5 hours at a temperature in the range of 145–150°, the autoclave was cooled to room temperature and the liquid reaction mixture withdrawn from the autoclave was analyzed by vapor phase chromatography. The analysis revealed that the product consisted of 79 percent nitrobenzene, 9.7 percent phenylisocyanate, 1.1 percent of aniline and 1.2 percent of benzoxazolone. Thus, the conversion of nitrobenzene was 21 percent and the corrected yield of benzoxazolone was 5.7 percent. These comparative data show that the addition of carbon dioxide increased the yield of benzoxazolone by a factor of greater than 4.

EXAMPLE 2

The equipment described in Example 1 was charged with 89 grams of toluene, 25 grams of nitrobenzene, 1.2 gram of palladium dichloride, and 3.6 grams of vanadium pentoxide. The autoclave was pressurized to 1000 p.s.i.g. with an equimolar mixture of carbon dioxide and carbon monoxide and this pressure was maintained throughout the experiment with carbon monoxide. Agitation and feeding of carbon monoxide at a rate of 500 to 1500 milliliter per minute (measured at atmospheric pressure) was started at room temperature and maintained throughout the experiment. After maintaining the temperature in the autoclave at 160 to 165° C. for about 8 hours, the autoclave was cooled to room temperature and the reaction mixture was analyzed by vapor phase chromatography. The volatile part of the reaction mixture analyzed 46 percent toluene, 0.9 percent nitrobenzene, 29.4 percent phenylisocyanate, 3.7 percent aniline, 7.9 percent benzoxazolone and 1.6 percent of unidentified reaction products. The analysis revealed that the conversion of nitrobenzene was 93 percent and the corrected yield of benzoxazolone was about 14 percent.

EXAMPLES 3–4

Using the same equipment as described in Example 1 and charging and feeding a mixture of carbon monoxide and carbon dioxide, benzoxazolone was formed, as evidenced by vapor phase chromatography analysis of the reaction mixture, in the presence of the following catalysts and employing the following reaction conditions.

| Ex. | Catalyst charged | P.s.i.g. | Temp., °C. | Analysis of reaction mixture, by percent | | | | | Percent conversion of nitrobenzene | Percent corr. yield of benzoxazolone |
| | | | | Nitrobenzene | Phenyl isocyanate | Aniline | Benzoxazolone | Others | | |
| --- | --- | --- | --- | --- | --- | --- | --- | --- | --- | --- |
| 3 | RhCl$_3$/Hastelloy B* | 500 | 180 | 93.8 | 1.0 | 0.0 | 1.7 | 0.6 | 6.2 | 27.4 |
| 4 | PdCl$_2$/Hastelloy B* | 500 | 138–165 | 76.3 | 8.0 | 0.9 | 2.2 | 7.8 | 23.7 | 9.3 |

*Hastelloy B is a trademark of Haynes Stellite Co. for an alloy comprised of 64 percent nickel, 28 percent molybdenum, 5 percent iron, 1 percent silicon, 1 percent chromium and 1 percent manganese. This catalyst was pretreated with thionyl chloride.

EXAMPLE 5

A 105 milliliter rocking autoclave, charged with 6 grams of nitrobenzene, 0.06 gram of palladium dichloride and 0.36 gram of vanadium pentoxide, was flushed three times with carbon monoxide and then pressurized with equimolar mixture of carbon dioxide and carbon monoxide to 1260 p.s.i.g. at room temperature. Rocking was started and maintained, while the autoclave was heated to 200° C. and kept at this temperature for 90 minutes. The autoclave was then cooled to room temperature and the reaction mixture, after filtration, analyzed by vapor phase chromatography. The analysis revealed that the filtered product consisted of 49 percent of nitrobenzene, 33.9 percent of phenyl isocyanate, 8 percent of benzoxazolone and about 5 percent of unidentified products. Thus, the conversion of nitrobenzene was 51 percent and the corrected yield of benzoxazolone was 15.7 percent.

EXAMPLE 6

The experiment of Example 5 was repeated, except that 0.06 gram of rhodium trichloride and 0.36 gram of vanadium pentoxide were charged as catalysts. The reaction product was diluted with toluene and filtered. Analysis of the filtrate by vapor phase chromatography was as follows: 65 percent of toluene, 19.6 percent of nitrotoluene, 11.2 grams of phenyl isocyanate, 5.8 percent of nitrotoluene, 11.2 grams of phenyl isocyanate, 5.8 percent of benzoxazolone and traces of unidentified products. This corresponds to a 67 percent conversion of nitrobenzene and a corrected yield of benzoxazolone of about 15 percent.

EXAMPLE 7 o-Chloronitrobenzene (25.0 g.), palladium chloride (0.25 g.) and vanadium pentoxide were charged to a 300 ml. Hastelloy rocking type autoclave (45 c.p.m.), which was pressured with an equimolar mixture of carbon monoxide and carbon dioxide to 1000 p.s.i.g. The autoclave was sealed and heated to 190° C. for 45 minutes, then cooled and vented. The liquid phase (27 g.), as determined by vapor phase chromatography, contained o-chlorophenylisocyanate (27.5 percent), o-chloronitrobenzene (44.6 percent) and a high boiling material (6.1 percent) whose vapor phase chromatography retention time was similar to that of benzoxazolone. The conversion of o-chloronitrobenzene was calculated to be 52 percent. The benzoxazolone material was separated using a preparative vapor phase chromatograph machine, and submitted for infrared analysis. The infrared spectrum indicated the presence of a benzoxazolone ring, and the structure was concluded to be chlorobenzoxazolone. The product yield, based on weight of chloronitrobenzene charged and corrected for the weight of chloronitrobenzene recovered, was calculated to be 11 percent.

Various modifications of the invention, some of which have been disclosed above, may be employed without departing from the spirit of the invention.

What is desired to be secured by Letters Patent is:

1. The process for preparing benzoxazolones which comprises reacting
   (A) an aromatic nitro compound
      (1) containing up to 14 carbon atoms, and
      (2) having at least one of the two ortho positions unsubstituted,
   (B) with a mixture of carbon dioxide and carbon monoxide in a ratio of between about 100:1 and about 0.05:1,
   (C) in the presence of a catalyst comprised of a mixture of
      (1) at least one halide selected from the group consisting of
         (a) palladium halides, and
         (b) rhodium halides, and
      (2) a metal-based compound selected from the group consisting of
         (a) an oxide of
            (i) vanadium
            (ii) niobium or
            (iii) tantalum and
         (b) a nickel alloy having an average composition of about
            (i) 64 percent nickel, 28 percent molybdenum, 5 percent iron, 1 percent silicon, 1 percent chromium and 1 percent manganese, or
            (ii) 56 percent nickel, 15.5 percent chromium, 16 percent molybdenum, 6 percent iron, 4 percent tungsten, 1 percent cobalt, 0.5 percent silicon, 0.5 percent manganese, 0.5 percent vanadium and traces of carbon, phosphorus and sulfur,
   (D) at a pressure in the range between about 30 and 10,000 p.s.i.g.,
   (E) at a temperature in the range between about 25 and 250° C., and
   (F) wherein the proportion of catalyst is between about 0.1 and about 100 percent by weight of said aromatic nitro compound.

2. The process of claim 1 wherein the mixture of carbon dioxide and carbon monoxide in the reactor is in the ratio of between about 25:1 and about 0.1:1.

3. The process of claim 2 wherein said catalyst is a mixture of palladium dichloride and vanadium pentoxide.

4. The process of claim 2 wherein said catalyst is a mixture of rhodium trichloride and vanadium pentoxide.

5. The process of claim 2 wherein said catalyst is a mixture of rhodium trichloride and a nickel alloy having an average composition of about 64 percent nickel, 28 percent molybdenum, 5 percent iron, 1 percent silicon, 1 percent chromium and 1 percent manganese.

6. The process of claim 5 wherein said nickel alloy was pretreated with an acid halide prior to the reaction, said acid halide being selected from the group consisting of acid halides of carbon, acid halides of sulphur, acid halides of phosphorus and acid halides of vanadium.

7. The process of claim 2 wherein said catalyst is a mixture of palladium dichloride and a nickel alloy having an average composition of about 64 percent nickel, 28 percent molybdenum, 5 percent iron, 1 percent silicon, 1 percent chromium and 1 percent manganese.

8. The process of claim 7 wherein said nickel alloy was pretreated with an acid halide prior to the reaction, said acid halide being selected from the group consisting of acid halides of carbon, acid halides of sulphur, acid halides of phosphorus and acid halides of vanadium.

9. The process of claim 2 wherein said aromatic nitro compound is nitrobenzene.

10. The process of claim 2 wherein said aromatic nitro compound is o-chloro nitrobenzene.

11. The process of claim 2 wherein the mixture of carbon dioxide and carbon monoxide is obtained by providing an atmosphere of carbon dioxide when the reactants are fed to the reactor and continuously feeding carbon monoxide to the reactor as the reaction progresses.

12. The process of claim 5 wherein said aromatic nitro compound is selected from the group consisting of nitrobenzene and o-chloro nitrobenzene.

13. The process of claim 6 wherein said aromatic nitro compound is selected from the group consisting of nitrobenzene and o-chloro nitrobenzene.

14. The process of claim 2 wherein the weight ratio of said halide to said metal-based compound is in the range between about 0.05:1 and about 10:1 and the proportion of said catalyst is between about 1 and about 60 percent by weight of said aromatic nitro compound.

References Cited

UNITED STATES PATENTS 3,256,293   6/1966   Baker et al. _____ 260—307

ALEX MAZEL, Primary Examiner

R. V. RUSH, Assistant Examiner

U.S. Cl. X.R.

252—441